United States Patent
Zhang

(10) Patent No.: US 10,051,116 B2
(45) Date of Patent: Aug. 14, 2018

(54) LINE DIAGNOSIS METHOD AND APPARATUS

(71) Applicant: ZTE CORPORATION, Shenzhen, Guangdong Province (CN)

(72) Inventor: Yong Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 15/326,652

(22) PCT Filed: Nov. 14, 2014

(86) PCT No.: PCT/CN2014/091182
§ 371 (c)(1),
(2) Date: Jan. 17, 2017

(87) PCT Pub. No.: WO2016/011732
PCT Pub. Date: Jan. 28, 2016

(65) Prior Publication Data
US 2017/0279960 A1    Sep. 28, 2017

(30) Foreign Application Priority Data

Jul. 21, 2014    (CN) .......................... 2014 1 0349093

(51) Int. Cl.
*H04M 1/24*    (2006.01)
*H04M 3/08*    (2006.01)
(Continued)

(52) U.S. Cl.
CPC ................................... *H04M 3/30* (2013.01)

(58) Field of Classification Search
None
See application file for complete search history.

(56) References Cited

U.S. PATENT DOCUMENTS 7,809,116 B2 * 10/2010 Rhee .................. H04B 3/48
379/1.03
8,184,778 B2 * 5/2012 Zhang .................. H04M 3/306
379/1.04
(Continued)

FOREIGN PATENT DOCUMENTS

CN    1852352 A    10/2006
CN    1933513 A    3/2007
(Continued)

*Primary Examiner* — Quoc D Tran
(74) *Attorney, Agent, or Firm* — Ling Wu; Stephen Yang; Ling and Yang Intellectual Property

(57) ABSTRACT

Disclosed are a line diagnosis method and apparatus. The method includes: acquiring a test result reported by a test device, herein, the test result is a test result acquired after the test device tests a line that needs line diagnosis (S102); and invoking a dynamic language file to analyze the test result and obtaining a line diagnosis result, herein, the dynamic language file includes known line fault types described in a dynamic language and corresponding judging conditions (S104). Through the technical solution, the problem in the related art that the time period of re-customizing a diagnosis program for line diagnosis is too long to satisfy the user demand is solved; the time period required by function customization is largely shortened during line diagnosis, and a user can rapidly adjust the analysis solution according to changes of the line situations, the user demand is satisfied and the user satisfaction is improved.

12 Claims, 4 Drawing Sheets

(51) Int. Cl.
*H04M 3/22* (2006.01)
*H04M 3/30* (2006.01)

(56) References Cited

U.S. PATENT DOCUMENTS

| | | | | |
|---|---|---|---|---|
| 2005/0141673 A1* | 6/2005 | Lunt | ....................... | H04M 3/30 |
| | | | | 379/22 |
| 2013/0018803 A1* | 1/2013 | Challu | ................... | G06Q 10/06 |
| | | | | 705/304 |
| 2013/0042222 A1 | 2/2013 | Maddela | | |
| 2015/0334225 A1* | 11/2015 | Bull | ....................... | H04B 3/46 |
| | | | | 379/22.07 |

FOREIGN PATENT DOCUMENTS

| CN | 101163054 A | 4/2008 |
|---|---|---|
| CN | 101771762 A | 7/2010 |
| CN | 103139400 A | 6/2013 |
| CN | 103164306 A | 6/2013 |
| CN | 103646104 A | 3/2014 |

\* cited by examiner

LINE DIAGNOSIS METHOD AND APPARATUS

TECHNICAL FIELD

The present disclosure relates to the field of communication, and in particular to a line diagnosis method and apparatus.

BACKGROUND

In the telecom device management system, the line diagnosis is a very important function. When fault occurs at a line or the routine maintenance and detection is performed on the line, it is required to perform the diagnosis on the line. If it is diagnosed that fault occurs at a line, then the specific fault information is fed back to the user to instruct the user for trouble shooting, and make the line normal.

In the actual use, lines and terminal devices used in different countries and regions may be different. By taking the voice line as an example, the telephone lines and the telephones used in different countries and regions may be different, so the line diagnosis cannot be analyzed and judged in accordance with a unified standard when the diagnosis is performed on the lines. The line diagnosis often needs to differentially be treated according to physical characteristics of the actual used lines and terminal devices, that is, to be customized according to the actual situations.

For those above problems, there are two solutions in the related art. One solution is to perform custom development in the diagnosis program of the diagnostic apparatus in accordance with the actual situations. The method can achieve the function customization, but the time period is relatively long and cannot respond to changes in time. When the diagnosis apparatus is required to use in a particular area, it is required to make full investigation to understand all lines and terminal situations of the area, and complete the procedures, such as, custom development, testing, releasing, etc., before the deployment, so the whole period is longer. When a new line or terminal device type or a line or terminal device type omitted in the previous investigation appears after the deployment, it may be required for this change to re-perform the procedures, such as, custom development, testing and releasing, etc., and re-deployed a new software version or a patch to the field after the new software version or the patch is released. The method cannot satisfy the field requirements quickly, while it needs to wait for a long time before completing the customization, which often causes the grievances of the user and even complaints.

The other method is to use a configuration file, and put the physical characteristic parameters of the lines with the differences into the configuration file, and read the parameter values in the configuration file by the diagnostic program to perform the analysis and judgment. After the field deployment, the parameter values in the file are adjusted according to the field conditions. The method can achieve the rapid customization to a certain extent. However, the configuration file can only store specific data, while cannot contain the judgment logic. That is, it only can achieve the customization of the specific data, and the judgment logic in the diagnostic apparatus is still in the diagnosis program. When the judgment logic is required to be customized according to the field situation, the diagnostic program still needs to be modified and re-deployed to the field after a new software version or a patch is released. There is still a problem that the time period is longer and the user demand cannot be satisfied in time.

In the related art, there is still no solution proposed till now for the problem in the related art that the time period of re-customizing a diagnosis program for line diagnosis is too long to satisfy the user demand.

SUMMARY

The embodiment of the present disclosure provides a line diagnosis method and apparatus, to solve the above technical problems at least.

A line diagnosis method is provided according to one embodiment of the present disclosure. The method includes: acquiring a test result reported by a test device, herein, the test result is a test result acquired after the test device tests a line that needs line diagnosis; and invoking a dynamic language file to analyze the test result and obtaining a line diagnosis result, herein, the dynamic language file includes known line fault types described in a dynamic language and judging conditions corresponding to the known line fault types.

After invoking a dynamic language file to analyze a test result, the method further includes: receiving the dynamic language file modified by a user; and in a next process of analyzing a test result, invoking the modified dynamic language file to analyze the test result and obtaining a line diagnosis result.

Invoking a dynamic language file to analyze the test result and obtaining a line diagnosis result includes: respectively judging whether the test result satisfies one or more of the known line fault types according to the known line fault types described in the dynamic language and the judging conditions corresponding to the known line fault types; and if yes, then summarizing all known line fault types that are satisfied by the test result, and determining the line fault type which is satisfied by the test result according to a summary result.

Invoking a dynamic language file to analyze the test result includes: invoking the dynamic language file through a dynamic language engine to analyze the test result.

Before acquiring a test result reported by a test device, the method further includes: issuing a test command to the test device.

The dynamic language includes at least one of the following: JavaScript language, Python language and PHP language.

A line diagnosis apparatus is further provided according to another embodiment of the present disclosure. The line diagnosis apparatus includes an acquiring module and an invoking module. The acquiring module is arranged to acquire a test result reported by a test device. Herein, the test result is a test result acquired after the test device tests a line that needs line diagnosis. The invoking module is arranged to invoke a dynamic language file to analyze the test result and obtain a line diagnosis result. Herein, the dynamic language file includes known line fault types described in a dynamic language and judging conditions corresponding to the known line fault types.

The apparatus further includes a receiving module arranged to receive the dynamic language file modified by a user. The invoking module is further arranged to, in a next process of analyzing the test result, invoke the modified dynamic language file to analyze the test result and obtain the line diagnosis result.

The invoking module includes a judgment unit, a summary unit and a determination unit. The judgment unit is arranged to respectively judge whether the test result satisfies one or more of the known line fault types according to the known line fault types described in the dynamic language and the judging conditions corresponding to the known line fault types. The summary unit is arranged to, when the test result satisfies one or more of the known line fault types, summarize all known line fault types that are satisfied by the test result. The determination unit is arranged to determine the line fault type which is satisfied by the test result according to a summary result.

The invoking module is further arranged to invoke the dynamic language file through a dynamic language engine to analyze the test result.

Through the embodiment of the present disclosure, a test result reported by a test device that needs line diagnosis is acquired; and a dynamic language file is invoked to analyze the above test result to obtain a line diagnosis result. Herein, the above dynamic language file includes known line fault types described in a dynamic language and judging conditions corresponding to the known line fault types. Therefore, the problem in the related art that the time period of re-customizing a diagnosis program for line diagnosis is too long to satisfy the user demand is solved. And the time period required by function customization is largely shortened during the line diagnosis, and a user can rapidly adjust the analysis solution according to changes of the line situations. Consequently, the user demand is satisfied and the user satisfaction is improved.

DESCRIPTION OF DRAWINGS

The accompanying drawings described herein are used to provide further understanding for the present disclosure and constitute a part of the present application. The illustrated embodiments of the present disclosure and the description thereof are used to explain the present disclosure, rather than constituting an inappropriate limitation to the present disclosure. Herein.

SPECIFIC EMBODIMENTS

The present disclosure is described in detail with reference to the accompanying drawings and in combination with embodiments hereinafter. It should be illustrated that, in the case of no conflicts, the embodiments in the present application and features in these embodiments can be combined with each other.

Other features and advantages of the present disclosure will be described in a subsequent specification, and partly become apparent from the specification, or understood through the implementation of the present disclosure. The objective and other advantages of the present disclosure can be achieved and obtained through the structures specifically pointed in the written specification, claims and accompanying drawings.

Figure 1:
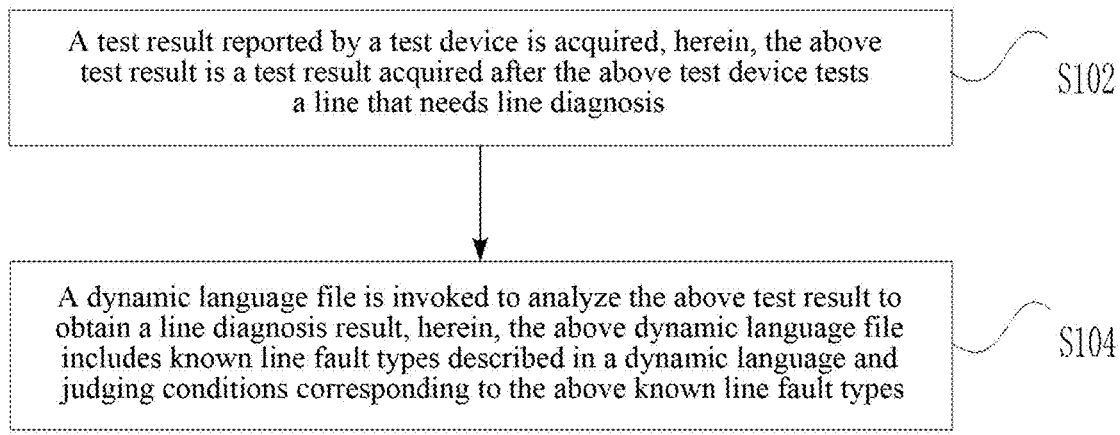
FIG. 1 is a flow chart of a line diagnosis method according to an embodiment of the present disclosure.

An embodiment of the present disclosure provides a line diagnosis method. FIG. 1 is a flow chart of a line diagnosis method according to an embodiment of the present disclosure. As shown in FIG. 1, the method includes the following steps 102 and 104.

In step S102, a test result reported by a test device is acquired. Herein, the above test result is a test result acquired after the above test device tests a line that needs line diagnosis.

In step S104, a dynamic language file is invoked to analyze the above test result to obtain a line diagnosis result. Herein, the above dynamic language file includes known line fault types described in a dynamic language and judging conditions corresponding to the known line fault types.

Through the above steps, the dynamic language file is used to analyze the test result reported by the test device. Herein, the above dynamic language file includes the known line fault types described in the dynamic language and the judging conditions corresponding to the known line fault types. Due to the programmability of the dynamic language, the dynamic language file can be quickly customized during the re-customization and immediately effect in the next analysis process, so that the user can rapidly modify the basis of analysis to the testing result according to changes of the line situations through the customization of the dynamic language file. Therefore, the problem in the related art that the time period of re-customizing a diagnosis program for line diagnosis is too long to satisfy the user demand is solved. The time period required by function customization is largely shortened during the line diagnosis, and a user can rapidly adjust the analysis solution according to changes of the line situations. Consequently, the user demand is satisfied and the user satisfaction is improved.

In the specific implementation process, if the current line detection environment changes, after the dynamic language file is invoked to analyze the above test result, the method may also include the following process: receiving the above dynamic language file modified by the user; and in a next process of analyzing the test result, directly invoking the above modified dynamic language file to analyze the test result and obtaining the line diagnosis result.

In the analysis process of the above step S104, considering that, due to the specificity of the line test, even if the test result satisfies the judging condition corresponding to one line fault type, it can only illustrate the possibility that the line may have that type of line fault, but it cannot directly illustrate that the line have that type of fault line. For example, if the line fault type B must be satisfied meanwhile the line fault type A is satisfied, then when the test result satisfies the judging conditions of the line fault type A and the line fault type B, that line actually only has the line fault of type A, but no line fault of type B. Therefore, as an alternative embodiment, the above step S104 may specifically include the following operations. Whether the above test result satisfies one or more of the above known line fault types is respectively judged according to the above known line fault types described in the dynamic language and the corresponding judging conditions. If yes, then all known line fault types that are satisfied by the above test result are summarized, and the line fault type which is satisfied by the above test result is determined according to a summary result. Through that way, in the situation that all the known line fault types that are satisfied by the test result are acquired, all the known line fault types are then summarized and analyzed, then more accurate line fault analysis result can be acquired. In an alternative embodiment of the embodiments of the present disclosure, invoking a dynamic language file to analyze the above test result may include: invoking the dynamic language file through a dynamic language engine to analyze the above test result.

Herein, the above dynamic language may include but not limited to at least one of the following: JavaScript language, Python language and PHP language.

In the embodiment of the present disclosure, before the test result reported by the test device that needs the line diagnosis is acquired, an executive body of the step S102, such as, a diagnosis program, further may initiate actively the test to the test device, that is, a test command may be issued to the above test device before the test result reported by the test device that needs the line diagnosis is acquired.

Figure 2:
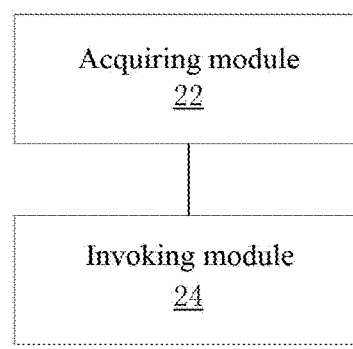
FIG. 2 is a structure block diagram of a line diagnosis apparatus according to an embodiment of the present disclosure.

The present embodiment further provides a line diagnosis apparatus, arranged to realize the above embodiments. Those, which have been illustrated, will no longer be repeated, and the modules involved in the apparatus are described hereinafter. As used hereinafter, the term "module" may be a combination of software and/or hardware to achieve a predetermined function. Although the apparatus described in the following embodiments is preferably realized by software, but the implementation of hardware or a combination of software and hardware may also be possible and conceived. FIG. 2 is a structure block diagram of a line diagnosis apparatus according to an embodiment of the present disclosure. As shown in FIG. 2, the apparatus includes an acquiring module 22 and an invoking module 24.

The acquiring module 22 is arranged to acquire a test result reported by a test device. Herein, the above test result is a test result acquired after the above test device tests a line that needs line diagnosis.

The invoking module 24, connected to the acquiring module 22, is arranged to invoke a dynamic language file to analyze the above test result and obtain a line diagnosis result. Herein, the above dynamic language file includes known line fault types described in a dynamic language and judging conditions corresponding to the known line fault types.

Through the combined action of the above modules, the dynamic language file is used to analyze the test result reported by the test device. Herein, the above dynamic language file includes the known line fault types described in the dynamic language and the corresponding judging conditions. Due to the programmability of the dynamic language, the dynamic language file can be quickly customized during the re-customization and immediately effect in the next analysis process, so that the user can rapidly modify the basis of analysis to the testing result according to changes of the line situations through the customization of the dynamic language file. Therefore, the problem in the related art that the time period of re-customizing a diagnosis program for line diagnosis is too long to satisfy the user demand is solved. The time period required by function customization is largely shortened during the line diagnosis, and a user can rapidly adjust the analysis solution according to changes of the line situations. Consequently, the user demand is satisfied and the user satisfaction is improved.

In an alternative embodiment, the invoking module 24 may also be arranged to analyze the above test result by invoking the dynamic language file through the dynamic language engine.

Figure 3:
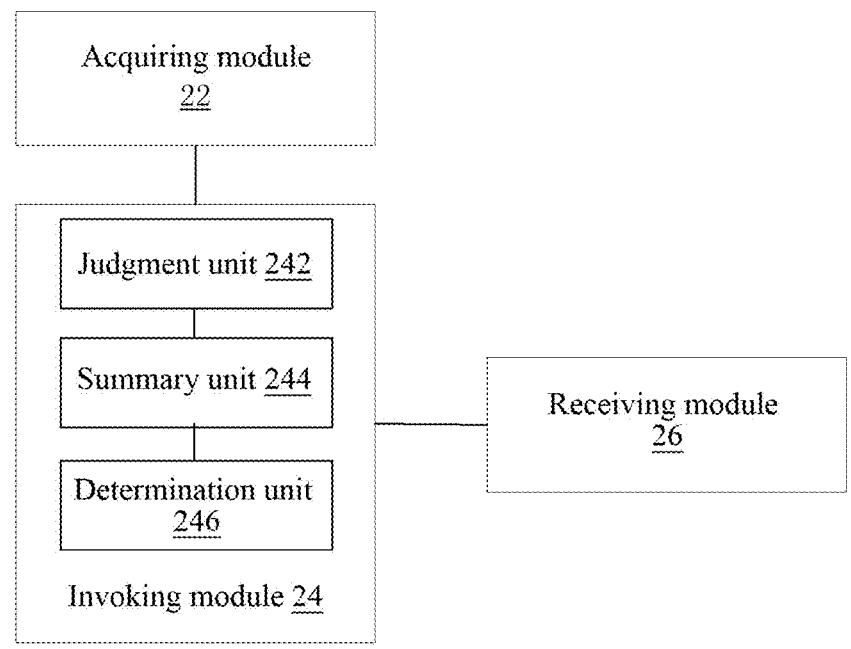
FIG. 3 is another structure block diagram of a line diagnosis apparatus according to an embodiment of the present disclosure.

FIG. 3 is another structure block diagram of a line diagnosis apparatus according to an embodiment of the present disclosure. As shown in FIG. 3, the above line diagnosis apparatus further includes a receiving module 26, arranged to receive the above dynamic language file modified by the user. The invoking module 24, connected to the receiving module 26, is further arranged to, in a next process of analyzing a test result, invoke the above modified dynamic language file to analyze the test result and obtain the line diagnosis result.

The further improvement to the above technical solution in the embodiment of the present disclosure lies in that, as shown in FIG. 3, the invoking module 24 may include a judgment unit 242, a summary unit 244 and a determination unit 246. The judgment unit 242 is arranged to respectively judge whether the above test result satisfies one or more of the above known line fault types according to the above known line fault types described in the dynamic language and the corresponding judging conditions. The summary unit 244, connected to the judgment unit 242, is arranged to, when the above test result satisfies one or more of the above known line fault types, summarize all known line fault types that are satisfied by the above test result. The determination unit 246, connected to the summary unit 244, is arranged to determine the line fault type which is satisfied by the above test result according to a summary result.

Figure 4:
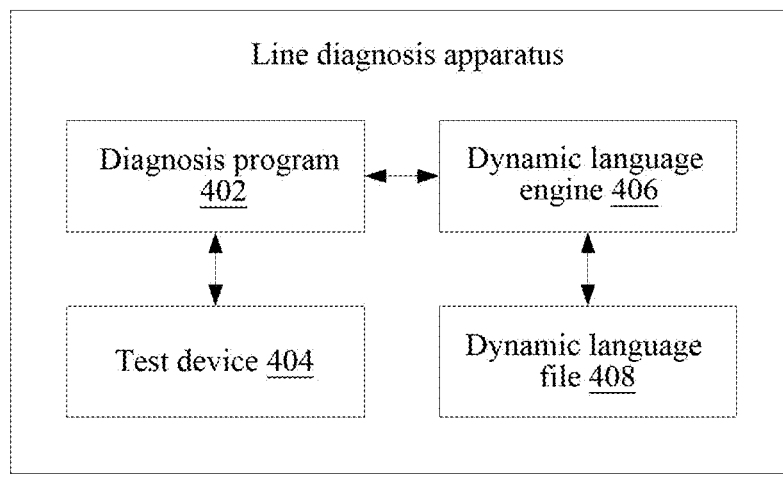
FIG. 4 is a structure block diagram of a line diagnosis apparatus according to an alternative embodiment of the present disclosure.

In order to better understand the work flow of the above line diagnosis method and apparatus, description is made by combining with the alternative embodiment hereinafter, but the description does not constitute limitations to the embodiments of the present disclosure. FIG. 4 is a structure block diagram of a line diagnosis apparatus according to an alternative embodiment of the present disclosure. The line diagnosis apparatus includes a diagnosis program 402, a test device 404, a dynamic language engine 406 and a dynamic language file 408.

The diagnosis program 402 is arranged to issue a line test command to the test device 404 according to the user operation, and read a test result from the test device 404, and invoke the dynamic language file 408 to analyze and diagnose the test result and display the diagnosis result to the user.

The test device 404 is arranged to receive the test command issued by the diagnosis program 402, and test the tested line and return the test result.

The dynamic language engine 406 is arranged to execute the dynamic language file 408. Herein, the dynamic language engine 406 may be a JavaScript engine, a Python engine, a PHP engine, etc.

The dynamic language file 408 is arranged to analyze and judge the test result and return the diagnosis result, which may be a JavaScript file, a Python file, a PHP file, etc.

Figure 5:
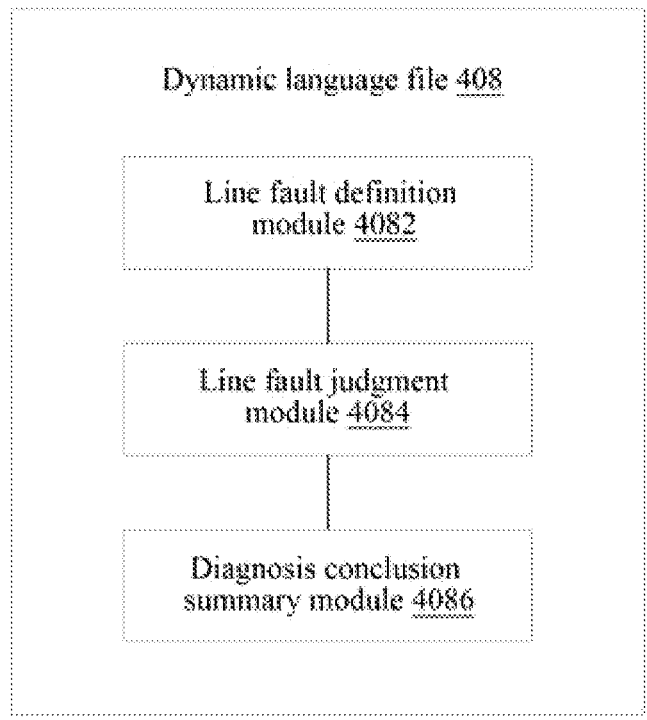
FIG. 5 is another structure block diagram of a line diagnosis apparatus according to an alternative embodiment of the present disclosure.

In an alternative embodiment of the embodiments of the present disclosure, as shown in FIG. 5, the dynamic language file 408 includes a line fault definition module 4082, a line fault judgment module 4084, and a diagnosis conclusion summary module 4086. Herein, the line fault definition module 4082 contains a plurality of known line faults and judging conditions corresponding to the known line faults. The line fault judgment module 4084 performs the judgment one by one according to the line faults and the judging conditions corresponding to the known line faults defined in the line fault definition module 4082. If the fault condition is satisfied, then it is believed that the fault may exist in the line, until all line faults are completely judged. The diagnosis conclusion summary module 4086 summarizes and analyzes the line faults acquired by the line fault judgment module 4084. Since the judgment of some line faults is more complex, it cannot be simply believed that, as long as the judging condition defined by the line fault definition module 4082 is satisfied, there must be the fault, the judgment of the complex line faults is also required to synthetically be judged according to the judging situations of other faults. For example, when the line test result satisfies the condition of the fault A, it is only illustrated that the line may have the fault A; if meanwhile the fault B is judged, then now the fault A may be excluded. The diagnosis conclusion summary module obtains the final line diagnosis conclusion after performing the summary and analysis.

Figure 6:
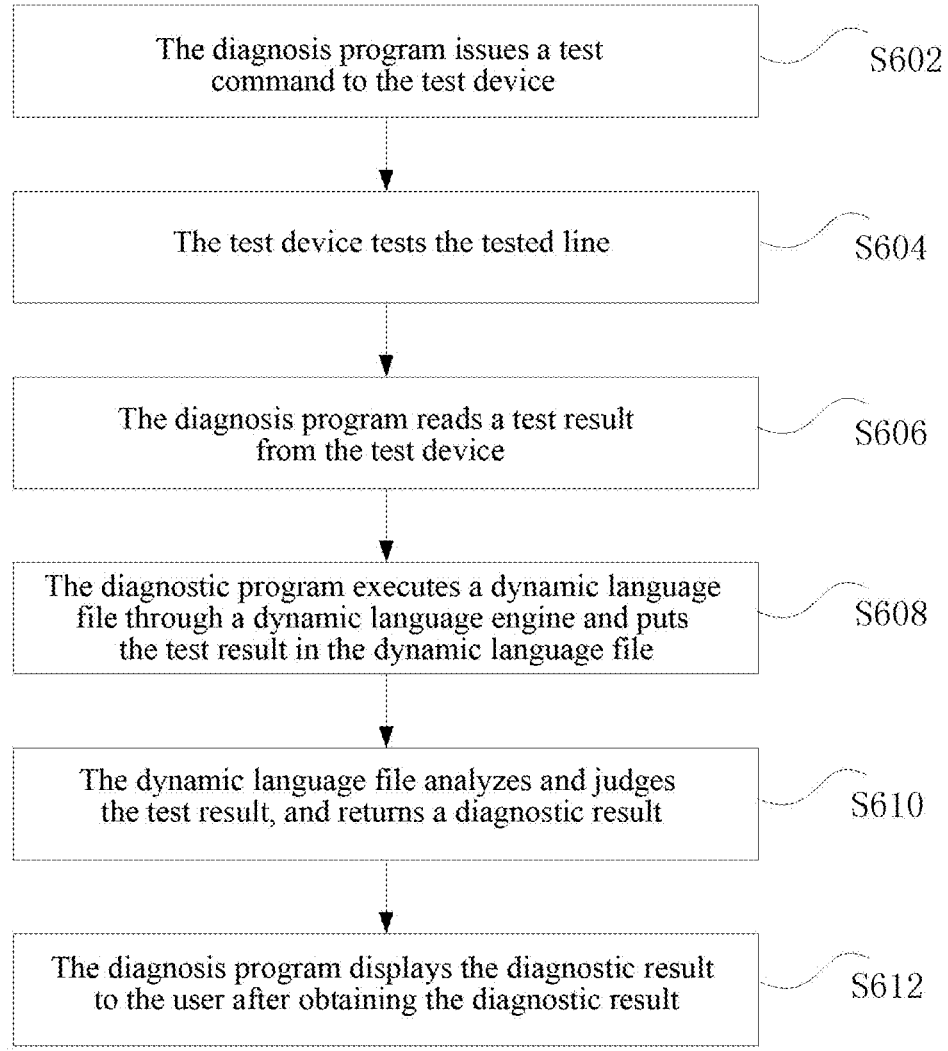
FIG. 6 is a flow chart of a line diagnosis method according to an alternative embodiment of the present disclosure.

An alternative embodiment of the present disclosure also provides a line diagnosis method applied to the line diagnosis apparatus as shown in the above FIG. 4. FIG. 6 is a flow chart of the line diagnosis method according to an alternative embodiment of the present disclosure, including the following steps S602-S612.

In step S602, the diagnosis program issues a test command to the test device.

In step S604, the test device tests the tested line.

In step S606, the diagnosis program reads a test result from the test device.

In step S608, the diagnostic program executes a dynamic language file through the dynamic language engine and puts the test result in the dynamic language file.

In step S610, the dynamic language file analyzes and judges the test result, and returns a diagnostic result.

In step S612, the diagnosis program displays the diagnostic result to the user after obtaining the diagnostic result.

Figure 7:
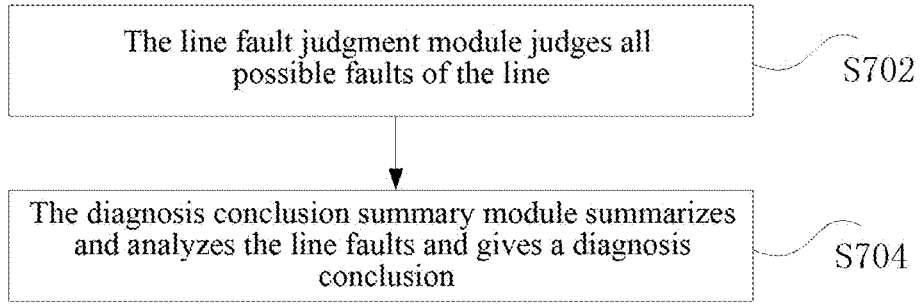
FIG. 7 is a diagnosis flow chart of a dynamic language file according to an alternative embodiment of the present disclosure.

FIG. 7 is a diagnosis flow chart of a dynamic language file according to an alternative embodiment of the present disclosure, applied in the above dynamic language file 408 as shown in FIG. 5. As shown in FIG. 7, the diagnosis flow includes the following steps S702-S704.

In step S702, the line fault judgment module (which realizes the function of the above judgment unit 242) judges one by one whether the line test result satisfies the judging conditions according to definitions of the line fault judging conditions; if yes, then it is believed that the fault may exist in the line.

In step S704, the diagnosis conclusion summary module (which realizes the functions of the summary unit 244 and the determination unit 246) summarizes and analyzes the line faults acquired by the line fault judgment module, and gives a final diagnosis conclusion.

To sum up, the embodiments of the present disclosure realize the following technical effects. The problem in the related art that the time period is too long to satisfy the user demand since a diagnosis program has to be re-customized when the line situation changes is solved. When the line is diagnosed, the part which needs to be customized according to the field situation is implemented by the dynamic language file, and the dynamic language file can immediately effect after the dynamic language file is modified. Therefore, the time period required by function customization is largely shortened, and the user satisfaction is improved.

The dynamic language file of the embodiments of the present disclosure not only may contain the specific physical characteristic parameters of the lines, but also may contain the judgment logic, which can effectively realize the customization of the diagnosis function on the whole.

The embodiment of the present disclosure saves the cost of additionally defining a set of identifiers which can not only contain data but also contain logic, thereby reducing the complexity of the technical scheme.

In another embodiment, software is further provided, and the software is used to implement the technical scheme described in the above embodiments and the alternative embodiments.

In another embodiment, a storage medium is further provided, and the storage medium stores the above software, and the storage medium includes but not limited to: CD, floppy disk, hard disk, erasable memory, etc.

Obviously, it can be understood by those skilled in the art that various modules or various steps above-mentioned in the present disclosure may be implemented by the universal calculating apparatus, and they may be integrated in a single calculating apparatus, or distributed in the network made up by a plurality of calculating apparatuses. Alternatively, they may be implemented by the executable program codes of the calculating apparatus. Accordingly, they may be stored in the storage apparatus and implemented by the calculating apparatus, and in some situations, the shown or described steps may be executed according to a sequence different from the sequence here, or they are made to various integrated circuit modules respectively, or a plurality of modules or steps therein are made into the single integrated circuit module to be implemented. Therefore, the present disclosure is not limit to any specific form of the combination of the hardware and software.

The above description is only the alternative embodiments of the present disclosure and is not intended to limit the present disclosure. For those skilled in the art, the present disclosure may have various modifications and variations. All of modifications, equivalents, improvement without departing from the rule and essence of the present disclosure should be embodied in the protection scope of the present disclosure.

INDUSTRIAL APPLICABILITY

As mentioned above, the line diagnosis method and apparatus provided by the embodiments of the present disclosure have the following beneficial effects. The problem in the related art that the time period of re-customizing a diagnosis program for line diagnosis is too long to satisfy the user demand is solved. The time period required by function customization is largely shortened during the line diagnosis, and a user can rapidly adjust the analysis solution according to changes of the line situations. Therefore, the user demand is satisfied and the user satisfaction is improved.

I claim:

1. A line diagnosis method, comprising:
acquiring a test result reported by a test device, wherein, the test result is a test result acquired after the test device tests a line that needs line diagnosis; and
invoking a dynamic language file to analyze the test result and obtaining a line diagnosis result, wherein, the dynamic language file comprises known line fault types described in a dynamic language and judging conditions corresponding to the known line fault types,
after invoking a dynamic language file to analyze the test result, further comprising:
receiving the dynamic language file modified by a user; and
in a next process of analyzing a test result, invoking the modified dynamic language file to analyze the test result and obtaining a line diagnosis result.

2. The method according to claim 1, wherein, invoking a dynamic language file to analyze the test result and obtaining a line diagnosis result comprises:

respectively judging whether the test result satisfies one or more of the known line fault types according to the known line fault types described in a dynamic language and the judging conditions corresponding to the known line fault types; and if yes, then summarizing all known line fault types that are satisfied by the test result, and determining the line fault type which is satisfied by the test result according to a summary result.

3. The method according to claim 1, wherein, invoking a dynamic language file to analyze the test result comprises:
invoking the dynamic language file through a dynamic language engine to analyze the test result.

4. The method according to claim 1, wherein, before acquiring a test result reported by a test device, the method further comprises:
issuing a test command to the test device.

5. The method according to claim 1, wherein, the dynamic language comprises at least one of the following:
JavaScript language, Python language and PHP language.

6. A line diagnosis apparatus, comprising:
an acquiring module, arranged to acquire a test result reported by a test device, wherein, the test result is a test result acquired after the test device tests a line that needs line diagnosis;
an invoking module, arranged to invoke a dynamic language file to analyze the test result and obtain a line diagnosis result, wherein, the dynamic language file comprises known line fault types described in a dynamic language and judging conditions corresponding to the known line fault types, and
a receiving module, arranged to receive the dynamic language file modified by a user;
wherein, the invoking module is further arranged to in a next process of analyzing a test result, invoke the modified dynamic language file to analyze the test result and obtain a line diagnosis result.

7. The apparatus according to claim 6, wherein, the invoking module comprises:
a judgment unit, arranged to respectively judge whether the test result satisfies one or more of the known line fault types according to the known line fault types described in the dynamic language and the judging conditions corresponding to the known line fault types;
a summary unit, arranged to, when the test result satisfies one or more of the known line fault types, summarize all known line fault types that are satisfied by the test result; and
a determination unit, arranged to determine the line fault type which is satisfied by the test result according to a summary result.

8. The apparatus according to claim 6, wherein, the invoking module is further arranged to invoke the dynamic language file through a dynamic language engine to analyze the test result.

9. The method according to claim 2, wherein, before acquiring a test result reported by a test device, the method further comprises:
issuing a test command to the test device.

10. The method according to claim 3, wherein, before acquiring a test result reported by a test device, the method further comprises:
issuing a test command to the test device.

11. The method according to claim 2, wherein, the dynamic language comprises at least one of the following:
JavaScript language, Python language and PHP language.

12. The method according to claim 3, wherein, the dynamic language comprises at least one of the following:
JavaScript language, Python language and PHP language.

* * * * *